United States Patent Office 2,998,330
Patented Aug. 29, 1961

2,998,330
PROCESS FOR COATING METALS AND COMPOSITIONS USEFUL THEREIN
Walter C. Snyder and Hershel B. Prindle, Freeport, Tex., assignors to The Dow Chemical Company, Midland, Mich., a corporation of Delaware
No Drawing. Filed Oct. 23, 1957, Ser. No. 691,804
24 Claims. (Cl. 117—132)

This invention relates to a process for protectively coating metals with a polymeric composition. More particularly it relates to such a process utilizing an aqueous composition.

A simplified flow diagram of the process of the present invention is as follows:

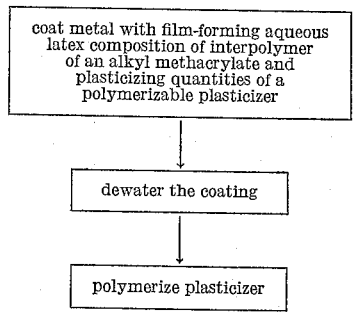

Articles made from almost all of the common metals are subject to deterioration through corrosion, oxidation, or similar effect or to damage through abrasion, deformation, or the like. A common practice to deter the corrosion and abrasion is to coat the articles with paints or lacquers. Also, in such applications as automobile body finishing, for example, the protective coating serves the additional function of providing decorative appeal, the commercial importance of which cannot be minimized. A coating composition that is to be used for such purposes must not only have an eye-catching initial appearance but also must have exceptional color stability to be able to withstand the aforementioned exposures.

The prior known paints and lacquers for metals have ordinarily been based on organic solvent systems. Such systems creat problems of flammability, toxicity, and ventilation for both the paint manufacturer and the paint applicator. In addition such systems are costly to prepare and to apply. Aqueous paint vehicles are usually considered to be undesirable because of the known tendency of water to initiate corrosion of metals, particularly iron and steels which are the most commonly utilized metals.

In the utilization of the organo-solvent-based paints and lacquers, it is frequently necessary to apply a plurality of coats to achieve adequate protection. That is particularly true of those applications, such as automobile body finishing, where the protected surface is to be subjected to repetitive exposure to sand and other abrasives, to water and sleet, to greases and oils, and to impact of stones and other solid objects.

Thus, the problems involved in finding and developing a useful protective coating for metals are many. First the coating must be capable of forming a continuous film which will resist the elements that cause corrosion and deterioration generally. The coating must have sufficient hardness to resist abrasion and other mechanical forces which tend to wear and to degrade it, yet be of sufficient resilience to be able to withstand minor deformations of the metal substratum without rupture of the film. The coating composition must be capable of pigmentation to give a stable color. Still further, the coating composition must be capable of easy application in protective thickness using conventional techniques.

Aqueous latexes of synthetic interpolymers have been widely accepted as useful constituents of paints to be employed in interior applications to non-metallic substrata. The interpolymers most widely used have been those of styrene and butadiene or those monomers closely related thereto. Those interpolymers are not suitable for use in exterior application because of their lack of requisite properties and are not suitable for application to metals because of lack of adhesion, softness, and like characteristics. However, due to the many disadvantages of organo-solvent based coating compositions, it would be highly desirably that an aqueous based composition useful for coating metallic articles be found.

The provision of a novel process for protectively coating metals is the principal object of this invention.

A further object is the provision of such a process employing an aqueous based coating composition.

It is a further object to provide such a process and composition using a synthetic polymer as the principal film-forming constituent.

The above and related objects are accomplished by means of the process consisting of (1) applying to a metal in protective thickness a wet coaoting of a film-forming, aqueous dispersion consisting essentially of an aqueous latex of an acrylic interpolymer which latex without modification is not film forming at ambient temperatures, said dispersion also containing as an essential constituent plasticizing amounts of a polymerizable compound as a plasticizer for said interpolymer, (2) dewatering said wet coating, and (3) inducing the polymerization of said compound. The compositions useful therein are additionally within the contemplation of the invention as are the articles coated thereby.

The film-forming constituent of the composition consists of a dispersion of an aqueous latex of certain acrylic interpolymers and a functionally specific plasticizer therefor. The interpolymers which are contemplated for use within the invention are those of certain acrylic monomers which in polymerized form are so hard as to preclude film-formability of their latexes at ambient temperatures by simple deposition. Those are the interpolymesr prepared from a monomeric material consisting of at least about 50 percent by weight of a lower alkyl ester of methacrylic acid together with a complementary amount of at least one other monoethylenically unsaturated monomer copolymerizable therewith, particularly an alkyl ester of acrylic acid. As the interpolymeric composition is increased in alkyl methacrylate, the interpolymer in latex form becomes less capable of film formation by simple deposition and curing at ambient temperatures. The lower polyalkyl methacrylates, such as those of alkyl groups having up to four carbon atoms, are so hard as to require excessive concentrations of plasticizer to achieve film formability. Accordingly, it is preferred to employ interpolymers having a composition of between about 50 and about 90 percent by weight of the alkyl methacrylate. It is likewise preferred to employ the lower alkyl esters having from 1 to 8 carbon atoms in the alkyl group, since such esters are more readily available, are less expensive than the others having more carbon atoms, polymerize more smoothly and rapidly, and are of the hardness desired in this process and these compositions.

The comonomer is preferred to consist of one or more alkyl acrylates, since such monomers have polymerization characteristics which are very amenable to copolymerization with the alkyl methacrylates. In addition, the properties of the interpolymers of the alkyl acrylates and alkyl methacrylates are especially well adapted for the coating compositions herein contemplated. The alkyl acrylate contributes resilience to the coating and contributes to the film formability of the aqueous dispersion. As with the methacrylates, it is preferred to employ the lower alkyl esters containing from 1 to 8 carbon atoms, because of availability cost, and copolymerizability characteristics with the alkyl methacrylates.

It should be apparent that the monomeric composition from which the interpolymer is prepared is capable of considerable variation within the above described limitations without loss of operability. The specifications for paints, including coatings for metals, depend upon the precise nature of the substratum and upon the end use of the coated article. Although any of the interpolymers falling within the stated scope will be operable for any of the common applications, nevertheless, the wide latitude of interpolymeric compositional variation makes possible the preparation of tailor made products when desired.

An example of an especially desirable combination of comonomers resulting in an interpolymer of general utility is methyl methacrylate and butyl acrylate. These latexes are easily prepared by conventional emulsion polymerization techniques wherein the monomeric materials are dispersed in an aqueous medium containing a wetting agent capable of emulsifying the monomers and also a water soluble polymerization catalyst, such as ammonium persulfate. Polymerization is initiated and maintained at a slightly elevated temperature until the desired conversion of monomer to polymer is attained. Following polymerization the latex is filtered to remove precoagulum and is frequently stabilized for storage by the incorporation of additional wetting agent.

Latexes which are to be employed in film-forming applications should usually contain at least 30 percent by weight and preferably at least 40 percent by weight of polymeric solids. Latexes containing appreciably less than 30 percent solids are so dilute as to preclude film formation by simple deposition or if formed to result in extremely thin films of poor properties. Latexes will usually not contain more than about 55 percent by weight of polymeric solids, because they are difficult to prepare and additionally are sensitive to storage and to mechanical shear.

The useful plasticizers for the interpolymer of the latex component contain as an essential constituent those compounds capable in monomeric form of plasticizing the interpolymer and which in addition are capable of polymerization into a polymeric substance which is compatible with the interpolymer. Vinyl and allyl substituted materials satisfy that need. Since hardness is one of the main properties desired, it is preferred to use those monomers which will polymerize into a cross-linked polymer. Those monomers contain at least two polymerizable monoethylenically unsaturated loci within the molecular structure and these monomers are hereinafter referred to as diethylenically unsaturated compounds. Representative of such preferred monomers are the following: diallyl itaconate, diallyl mafeate, diallyl diglycollate, diallyl adipate, vinyl allyl ether, divinyl phthalate, diethylene glycol diacrylate, ethylene dimethacrylate and divinylbenzene. Other suitable compounds useful for the stated utility will be known to those skilled in the art. As previously mentioned, the useful plasticizers for use in this invention are those which will plasticize the interpolymer and thereby impart film-formability to the latex which in unmodified condition is non-film forming. By film forming is meant the ability of a latex to air dry to a continuous, coherent film from the simple deposition of the latex on to a suitable substratum. The useful plasticizers in addition are those which are autopolymerizable at elevated temperatures such as those at which paint films are commonly baked or are polymerizable with small concentrations of the usual addition polymerization catalysts. It is also possible to replace a part of the polymerizable plasticizer with a non-polymerizable plasticizer. The non-polymerizable plasticizers are those known materials which will plasticize the acrylate and methacrylate polymers and copolymers generally. Typical of those plasticizers are the esters of phthalic acid such as n-butyl benzyl phthalate. By the use of such non-reactive plasticizers, an additional control on the properties, such as hardness, resilience and the like, is obtained.

The total amount of plasticizer that should be used in the composition will vary depending upon the particular copolymer and plasticizer employed. However, the plasticizer will usually be used in a concentration of from about 5 to about 35 percent by weight based on the weight of the polymer. The polymerizable plasticizer should constitute at least about 50 percent of the total weight of plasticizer used, although if hardness is not required much less polymerizable plasticizer may be employed. As a general rule, as the polymer composition is increased in methacrylate content relative to the comonomer, the total concentration of plasticizer required will also increase, but the need for the added hardness of the coating resulting from the polymerizable plasticizer will be lessened. For example, a latex of polymethylmethacrylate required 50 percent by weight of plasticizer to be film forming, a latex of 75 percent by weight of methyl methacrylate and 25 percent by weight butyl acrylate required 24 percent by weight of plasticizer to be film forming, and a latex of 55 percent by weight of methyl methacrylate and 45 percent by weight of butyl acrylate was film forming without any plasticizer.

Other ingredients which are used in paint manufacture may be added to the film-forming dispersion in their usual concentrations. Pigments are representative of such ingredients and are essential in the preparation of commercially acceptable decorative top coats. Light, heat, and latex stabilizers are examples of other common additives.

The film-forming dispersion may be prepared using conventional blending equipment and known techniques. A convenient blending procedure is to prepare a pigment slip containing the pigment, stabilizers, and any other additives. The pigment slip is then intermixed with the latex after which the plasticizers are added. Finally the resulting dispersion is passed through a paint mill or other homogenizing device to achieve the desired product. It should be understood that the compositions of this invention are those which have uniform distribution of all ingredients and are not limited to their method of formulation. Other blending procedures will also achieve the desired homogeneity.

Procedurally the process of the present invention consists of first applying a coating of the film-forming dispersion to the metal substratum. If the coating is applied as the prime coating, the metal must be cleaned of oil and grease before applying the coating. Because the coating compositions of this invention are employed in an aqueous vehicle, it is not necessary that the metal substratum be completely dry, although it should be apparent that large amounts of water will act as a diluent for the coating composition and consequently might affect the uniformity of thickness of the deposited coating. When the coating composition is applied as a top coat over a known prime coat or over the same composition the surface should be cleaned and prepared in the usual manner.

The coating compositions of this invention may be applied to the metal substratum by any of the conventional application methods. These include roller coating, brushing, and spraying. Each of those methods, as is known, requires a composition of different body for optimum application. Roller coating requires a comparatively viscous composition and, if desired, small amounts of water-soluble or water-dispersible thickeners, such as hydrophilic gums, starches, and cellulose ethers, may be added to the dispersion to achieve a suitable body. Some of those thickeners may require the further addition of known fungicides to increase their resistance to natural degradation. Spray coating requires a comparatively thin body and if desired, the compositions may be diluted with water to achieve a suitable viscosity for such an application method. The simple adaptability of the present compositions to any method of application is highly desirable and is one of the advantages of the coatings.

The second step of the process consists of dewatering the applied coating. This may be achieved by air drying and evaporation of the water from the coating. However, as a practical matter and as a preferred technique, the dewatering may be carried out simultaneously with the next step which consists of baking the coating to fuse the polymeric material into a continuous, coherent, tough, hard film and to cause the polymerizable plasticizer to polymerize at the same time. Exposure of the coated metals to temperatures of about 200° F. to 275° F. or higher for about 15 minutes or longer is usually sufficient to accomplish this result. The optimum temperature and times required for the baking will vary with the thickness of the coating, the copolymer composition, the polymerizability of the placticizer, and other similar factors. The result is the readily discernible hard, dry surface. A skilled worker will have no difficulty in arriving at the optimum baking conditions with but simple preliminary experiments.

The compositions of this invention result in tough, hard coatings which are well suited to meet the rigorous specifications needed for most metal coating applications. The dried films are impact and abrasion resistant, insensitive to water and the common greases, oils and gasolines, exhibit good adhesion to the metal substratum, have adequate elongation to withstand minor deformation of the coated article, and are resistant to salt sprays and other causes of corrosion. One of the chief advantages of the process and the compositions, however, is that the need for flammable, toxic, organic solvents is eliminated by the use of an aqueous vehicle.

The following examples are offered by way of illustrating the useful compositions and the process. In the examples all parts and percentages are by weight.

*Example 1*

A latex was prepared by the emulsion polymerization at 70° C. of a monomeric material consisting of 67 parts of methyl methacrylate, 20 parts of butyl acrylate and 1 part of acrylic acid. The latex after polymerization contained about 45 percent of polymeric solids. To the latex was added 12 parts of diallyl phthalate as a polymerizable plasticizer and 13 parts of n-butylbenzyl phthalate as a non-reactive plasticizer. Also added to the dispersion was 6 parts of a phenolic resin dispersion sold commercially as BRL 1100 by The Bakelite Corporation.

The dispersion was applied to degreased steel and baked at 275° F. for 30 minutes. The properties of the coating were compared to those of several primers sold commercially as Duco, Dulux, and Lucite by E. I. du Pont de Nemours and Company, and AC 33 sold commercially by the Rohm and Haas Chemical Company. All of the coatings were applied in a comparative thickness to the coating of this invention.

The coatings were subjected to the following testing procedures, details of which may be found in ASTM Standards, part 4 (1957) at the page numbers indicated. ASTM B-117-54T, page 668, wherein a coated panel is placed in a fog chamber at about 95° F. and exposed to the spray of about a 5 percent aqueous sodium chloride solution. The panels are examined for film failure and for evidence of corrosion. Results of this test are listed under salt spray adhesion; ASTM D-870-54T, page 665, wherein steel panels are coated and partially immersed in distilled water for 115 hours. The panels are examined for blistering, wrinkling, disintegration, loss of adhesion, and color change. Results of this test are listed under water immersion; ASTM D-522-41, page 408, wherein coated steel panels are bent about a conical mandrel. The panels are examined for cracking and other physical failure. Results are listed under mandrel bend.

An impact test was made with the Gardner No. 1670 variable impact tester sold by Gardner Laboratories, Incorporated, Bethesda 14, Maryland. Results are listed under impact.

In the table that follows, the results were translated into relative numerical values on a scale where 10 means no failure and lower numbers indicate proportionately poorer performance.

| Composition | Salt Spray Adhesion | Water Immersion | Impact | Mandrel Bend |
|---|---|---|---|---|
| Composition of this invention | 9 | 9 | 9 | 9 |
| Duco | 4 | 8 | 7 | 3 |
| Dulux | 9 | 4 | 9 | 10 |
| Lucite | 6 | 4 | 8 | 10 |
| AC 33 | 3 | 3 | 10 | 10 |

The performances of composition of the present invention shows a significant improvement over even the commercially accepted primers.

*Example 2*

A finish coating composition was prepared in the same manner as the prime coating composition of Example 1 except that the phenolic resin was eliminated from the recipe.

Steel panels were primed with the primer coating of this invention as in Example 1 and a finish coat of the above composition applied over the prime coatings. For comparison the comparative prime coatings of Example 1 were coated with the same coating as the primer in each case. Each of the coatings was applied to the same thickness of coating.

The panels were subjected to the same tests as in Example 1 and in addition, to gloss test, ASTM D-523-53T, page 608, wherein an incandescent light source is directed at a test specimen and the amount of reflectance caught with a photosensitive device. The test used 60° geometry. The results are in terms of percent reflectance.

The hardness of the films was determined with a Sward Hardness rocker sold by Gardner Laboratories, Incorporated, of Bethesda 14, Maryland. In the results listed higher values indicate greater hardness.

The coatings were immersed in distilled water for 72 hours and examined for softening. These results are listed under water sensitivity.

The results are tabulated in the following table.

| Composition | Salt Spray Adhesion | Rust | Impact | Mandrel Bend | Hardness | Gloss | Water Sensitivity |
|---|---|---|---|---|---|---|---|
| Composition of this invention | 10 | 9 | 9 | 9 | 24 | 86 | no softening. |
| Duco | 1 | 8 | 2 | 1 | 32 | 65 | Do. |
| Dulux | 9 | 8 | 10 | 10 | 24 | 91 | softens 24 hrs. |
| Lucite | 6 | 9 | 4 | 3 | 16 | 50 | no softening. |
| AC 33 | 3 | 3 | 10 | 10 | 6 | 85 | softens. |

As with the primer coating results, the overall performance of the compositions of this invention is superior to the commercial coatings.

The same relative results were obtained when the diallyl phthalate was replaced by diallyl itaconate, diallyl maleate, diallyl diglycollate, diallyl adipate, vinyl allyl ether, vinyl phthalate, diethylene glycol diacrylate, ethylene dimethacrylate, and divinyl benzene.

We claim:
1. A coating composition for protecting metals comprising a film-forming dispersion of an aqueous latex of an acrylic interpolymer composed predominantly of an alkyl ester of methacrylic acid which, without modification, is not film-forming at ambient temperatures and plasticizing quantities of a polymerizable diethylenically unsaturated plasticizer.

2. The composition claimed in claim 1 wherein said acrylic interpolymer is composed of at least 50 percent by weight of an alkyl ester of methacrylic acid together with not over 50 percent by weight of at least one other monoethylenically unsaturated monomer copolymerizable therewith.

3. The composition claimed in claim 2 wherein said monoethylenically unsaturated monomer consists of an alkyl acrylate.

4. The coating composition claimed in claim 1 wherein said polymerizable diethylenically unsaturated compound is a diallyl ester of a dibasic acid.

5. The coating composition claimed in claim 4 wherein said diallyl ester is diallyl phthalate.

6. The coating composition claimed in claim 1 wherein said polymerizable diethylenically unsaturated compound is vinyl allyl ether.

7. The coating composition claimed in claim 1 wherein said polymerizable diethylenically unsaturated compound is a diacrylate ester of an alkylene glycol.

8. The coating composition claimed in claim 1 wherein said polymerizable diethylenically unsaturated compound is ethylene diacrylate.

9. A process for protectively coating metals consisting of (1) applying to said metal in protective thickness a wet coating of a film-forming aqueous dispersion of an aqueous latex of an acrylic interpolymer composed predominantly of an alkyl ester of methacrylic acid which, without modification, is not film forming at ambient temperatures together with plasticizing quantities of a polymerizable diethylenically unsaturated plasticizer, (2) dewatering said wet coating, (3) inducing the polymerization of said polymerizable plasticizer.

10. The process claimed in claim 9 wherein said acrylic interpolymer is composed of at least 50 percent by weight of an alkyl ester of methacrylic acid together with not over 50 percent of at least one other monoethylenically unsaturated monomer copolymerizable therewith.

11. The process claimed in claim 10 wherein said monoethylenically unsaturated monomer consists of an alkyl acrylate.

12. The process claimed in claim 9 wherein said polymerizable diethylenically unsaturated compound is a diallyl ester of a dibasic acid.

13. The process claimed in claim 12 wherein said diallyl ester is diallyl phthalate.

14. The process claimed in claim 9 wherein said metal is degreased prior to step (1).

15. The process claimed in claim 9 wherein said metal has applied thereto a primer coating prior to step (1).

16. The process claimed in claim 9 as a two stage process wherein first said steps (1) to (3) use an unpigmented dispersion and are applied to said metal as a primer coating and said steps (1) to (3) are repeated using a pigmented dispersion as a decorative coating.

17. The process claimed in claim 9 wherein said dewatering step is carried out by air drying said wet coating.

18. The process claimed in claim 9 wherein said wet coating is dewatered and simultaneously said polymerizable plasticizer is caused to polymerize thermally by baking said wet coating of said step (1) at a temperature of at least 200° F. for at least 15 minutes.

19. The process claimed in claim 9 wherein said metal is steel.

20. A coated metal article consisting of a ferrous metal article coated with a dried coating of an interpolymer of at least 50 percent by weight of an alkyl ester of methacrylic acid together with not more than 50 percent by weight of at least one monoethylenically unsaturated monomer copolymerizable therewith and plasticizing amounts of a polymeric plasticizer homopolymerized from a diethylenically unsaturated compound.

21. The coated metal article claimed in claim 20 wherein said monoethylenically unsaturated monomer is an alkyl ester of acrylic acid.

22. The coated metal article claimed in claim 20 wherein said diethylenically unsaturated compound is a diallyl ester of a dibasic carboxylic acid.

23. The coated metal article claimed in claim 22 wherein said diallyl ester is diallyl phthalate.

24. The coated metal article claimed in claim 20 wherein said ferrous metal is steel.

References Cited in the file of this patent

UNITED STATES PATENTS

| | | |
|---|---|---|
| 2,046,886 | Strain | July 7, 1936 |
| 2,155,590 | Garvey | Apr. 25, 1939 |
| 2,544,691 | Kugler et al. | Mar. 13, 1951 |
| 2,570,253 | Lundquist | Oct. 9, 1951 |
| 2,760,886 | Prentiss | Aug. 28, 1956 |
| 2,930,106 | Wrotnowski | Mar. 29, 1960 |